United States Patent [19]

Ukawa et al.

[11] Patent Number: 5,395,561
[45] Date of Patent: Mar. 7, 1995

[54] METHOD OF PRODUCING SOLID MOLDINGS FROM A BY-PRODUCT OF WET LIMESTONE-GYPSUM DESULFURIZATION OF FLUE GAS

[75] Inventors: Naohiko Ukawa; Hiroshi Fujita; Toru Takashina; Masakazu Onizuka; Atsushi Tatani; Kenji Inoue, all of Hiroshima; Tsuyoshi Ohishi, Tokyo, all of Japan

[73] Assignee: Mitsubishi Jukogyo Kabushiki Kaisha, Tokyo, Japan

[21] Appl. No.: 978,259

[22] Filed: Nov. 20, 1992

[30] Foreign Application Priority Data

Nov. 20, 1991 [JP] Japan .................. 3-304796
Jan. 16, 1992 [JP] Japan .................. 4-005401

[51] Int. Cl.⁶ .............................. B28B 1/00
[52] U.S. Cl. ............................ 264/37; 264/82; 264/234; 264/333
[58] Field of Search ........ 264/82, 333, 31, DIG. 49, 264/DIG. 69, 37, 234

[56] References Cited

U.S. PATENT DOCUMENTS

| 4,127,628 | 11/1978 | Uchida et al. | 264/333 X |
| 4,219,515 | 8/1980 | Helser et al. | 264/82 X |
| 4,219,519 | 8/1980 | Goksel | 264/82 |
| 4,250,134 | 2/1981 | Minnick | 264/82 X |
| 4,342,732 | 8/1982 | Smith . | |
| 4,397,801 | 8/1983 | Minnick | 264/82 X |
| 4,477,397 | 10/1984 | Helser | 264/333 X |
| 4,925,614 | 5/1990 | Gebhard | 264/333 X |
| 5,211,750 | 5/1993 | Smith et al. | 264/69 X |

FOREIGN PATENT DOCUMENTS

| 2721932 | 6/1978 | Germany | 264/DIG. 49 |
| 3109879 | 9/1982 | Germany | 264/DIG. 49 |
| 0211547 | 7/1984 | Germany | 264/333 |
| 0057934 | 4/1984 | Japan | 264/333 |
| 0808483 | 2/1981 | U.S.S.R. | 264/333 |

Primary Examiner—Jan H. Silbaugh
Attorney, Agent, or Firm—Jacobson, Price, Holman & Stern

[57] ABSTRACT

A method of producing solid molding products from a slurry which has undergone absorption in wet-limestone gypsum desulfurization of flue gas includes the steps of concentrating the gypsum-containing absorption slurry, mixing and kneading the solid concentrated slurry with flyash and quicklime or slaked lime, molding the mixture into a given shape using a mold and then curing a resulting molding product in a reaction chamber wherein a part of desulfurized gas is passed. The method also includes solidifying a molded product by drying with water-saturated hot air produced with heat recovered from the flue gas and with water added into a heat recovery process.

8 Claims, 4 Drawing Sheets

METHOD OF PRODUCING SOLID MOLDINGS FROM A BY-PRODUCT OF WET LIMESTONE-GYPSUM DESULFURIZATION OF FLUE GAS

BACKGROUND OF THE INVENTION

1. Field of the Invention

The present invention relates to a method of producing solid moldings which can be effectively used as building materials from two ingredients: a slurry which is a by-product from an apparatus for removing sulfur dioxide gas (hereinafter referred to as "$SO_2$") by absorption from combustion gas using limestone as an absorbent, and a flyash obtained from a coal-fired combustor.

The present invention also relates to a method of producing solid articles which can be used as building materials from a slurry drawn from a wet limestone-gypsum-process flue-gas desulfurization apparatus after the absorption process.

2. Description of the Related Art

A wet limestone-gypsum-process flue-gas desulfurization apparatus uses a slurry in which limestone is suspended to absorb $SO_2$ from flue gas with an attendant neutralization reaction. It thus can achieve a high rate of $SO_2$ absorption and is in wide use as an excellent desulfurization method which can be done with very compact equipment and which is inexpensive in operation. However, there are problems inherent to an apparatus of this type. They are the treatment of the slurry after absorption and that of the waste water.

The former has been solved generally by separating the slurry into solids and liquid using a centrifuge and by thus taking out gypsum, the principal component of the slurry, as a solid product. The gypsum is formed into plasterboard for walls or used as an additive to cement. A common solution for the latter has been setting up waste water treatment installations. Effluents from industrial processes and the like generally contain heavy metals and COD-increasing substances. From the viewpoint of environmental protection the waste water treatment facilities for the elimination of these deleterious substances are essential. Also, for the purposes of process operation the accumulation of impurities in the absorbent slurry which would result in a decrease in the $SO_2$ absorptivity has to be prevented. Thus, it is necessary to discharge spent liquid from the system and accordingly treat the waste liquid.

FIG. 3 is a schematic diagram illustrating a typical arrangement for the conventional treatment of slurry and waste water. A conventional process for treating slurry and waste water will be explained below with reference to this drawing. $SO_2$-containing flue gas is introduced via line 301 into an absorption column 302, where it comes in contact with a circulating slurry. A tank 303 at the bottom of the absorption column is supplied with air through line 304 to oxidize calcium sulfite in the slurry to gypsum.

The slurry in which gypsum particles and limestone particles are suspended is forced out and up from the bottom tank 303 of the absorption column by an absorption-column circulating pump 305. It is then sprayed through spray pipes 306 to absorb $SO_2$ from the flue gas. The treated gas is discharged from the system by way of line 307. Limestone particles which are an ingredient for the absorbent are fed through line 309 to a material preparation tank 308, where they are mixed with a filtrate supplied through line 310 to form a slurry. The slurry is supplied via line 311 to the tank 303 at the bottom of the absorption column. The slurry circulating through the absorption column is partly drawn out through line 312 into a solid-liquid separator 313, where gypsum 314 is recovered as a by-product.

A part of the filtrate from the solid-liquid separator 313 is conducted through line 315 into a first thickener 316 which is a component unit of a water-treatment system. To the first thickener 316 added through line 317 is a $Ca(OH)_2$ slurry as a pH adjuster so as to remove suspended solids, such as flyash, and also precipitate and remove metallic constituents as hydroxides. The suspended solids and heavy metal hydroxides are discharged together as a sludge 319 from the first thickener 316 via an underflow line 318 out of the system. Overflow liquid from the first thickener 316 is led through line 320 into a second thickener 321, where an $Na_2CO_3$ solution is added by way of line 322 in order to precipitate for removal the calcium that can cause troubles associated with hard steam in the subsequent treatment steps. The precipitate is discharged as a sludge 324 from the second thickener 321 via an underflow line 323 to the outside.

An overflow from the second thickener 321 is led through line 325 to a thermal decomposition tank 326, where it is mixed with sulfuric acid supplied via line 327 and heated together. In this way the COD-increasing components, mainly dithionic acid, are separated from the absorption liquid and then, after the adjustment of pH with caustic soda added via line 328, the liquid is drained from the system.

In another example of conventional process shown in FIG. 4, untreated flue gas 401 is introduced into an absorption column 402 where it is freed from sulfur by contact with a spray of circulating absorption slurry which is forced out of an array of spray pipes 406 in the upper space of the column 402 by a pump 405. It is then discharged as clean gas 407. The circulating absorption slurry that has absorbed $SO_2$ from the flue gas and flown down into a circulating tank 403 contains the absorbed $SO_2$ in the form of a sulfite. In order to oxidize this sulfite to gypsum, air 404 is injected into the circulating tank 403 at the bottom. Meanwhile, line 411 supplies the circulating tank 403 with a limestone slurry absorbent in an amount adequately proportional to the stoichiometric amount of the $SO_2$ absorbed. An amount of the circulating absorption slurry corresponding to that being supplied is drawn out via line 412 into a filtrate and a solid-liquid separator 413, where it is separated into a solid phase 414 consisting mainly of gypsum. Part of the filtrate is conducted through line 410 to a limestone slurry storage tank 408 for the preparation of a limestone slurry, while the remainder is discharged from the system by way of line 415 to a waste water disposal station 416. Limestone is fed through line 409 to the limestone storage tank 408.

In conventional processes, solids are separated from the slurry after absorption, and the resulting gypsum is utilized, e.g., in the form of plasterboard or an additive to cement. However, local environments and situations have sometimes made it impossible to maintain an adequate balance between the demand and supply of this material. Thus, recovered gypsum has not always been effectively utilized; some part of it has often to be disposed of at landfill. The sludge that results from the treatment of waste water has to be abandoned also, while a market for its effective use has been sought.

Another problem has been that, as FIG. 3 indicates, the waste water treatment involves such complex process steps that it requires much manpower for the operation control and a fairly large land for the placement of the equipment.

In the case of the flue gas coming from a coal-fired combustor, a large volume of flyash is recovered from it by a dust collector. At present, a small percentage of the flyash is utilized as cement material and the like but most is abandoned for landfill. In some regions the shortage of available landfill is a serious problem.

SUMMARY OF THE INVENTION

In view of the state of the art described above, an object of the present invention is to provide a method applicable to the wet limestone-gypsum desulfurization of flue gas and which makes possible the effective utilization of spent absorption slurry and recovered flyash, does not require waste water treatment, and permits the reduction of equipment and operational costs.

Another object of the present invention is to provide a useful method of converting a by-product from a wet lime-stone-gypsum desulfurization of flue gas into products that can be used as building materials.

A first aspect of the present invention provides a method of producing solid moldings from a slurry obtained after absorption as a by-product from a wet limestone-gypsum-process flue-gas desulfurization apparatus which method is characterized by the steps of concentrating a gypsum-containing absorption slurry drawn from the apparatus, mixing and kneading the solid concentrated slurry with flyash from a coal-fired combustor and also with either quicklime or slaked lime, molding the mixture in a mold into a given shape, and then curing a resulting molding in a reaction chamber through which a part of desulfurized gas is passed.

The method according to the first aspect of the invention eliminates the need of waste water treatment that has been considered to be inherent to the wet limestone-gypsum-process flue-gas desulfurization method. It makes possible not merely the reduction of equipment and operational costs, but also effective utilization of spent absorption slurry and flyash that have hitherto found only limited use.

A second aspect of the invention provides a method of solidifying a by-product from a wet limestone-gypsum-process flue-gas desulfurization apparatus characterized by the steps of concentrating an absorption slurry drawn from the apparatus, kneading the concentrated slurry which consists mostly of gypsum with flyash and either quicklime or slaked lime and molding the mixture to given shapes, and then solidifying the same by drying with water-unsaturated hot air produced with heat recovered from the flue gas.

According to the second aspect of the present invention the mixing ratio by weight of the concentrated slurry (gypsum; on a dry basis) : flyash: quicklime is approximately in the range of 25–40:40–65:6–20.

The water-unsaturated hot air may be obtained in a variety of ways using the heat recovered from flue gas. A typical method comprises heating water and air separately with the heat recovered from the flue gas, bringing the hot water and hot air into contact to make the hot air water-saturated, and then mixing it with an additional amount of the hot air to produce hot air undersaturated with water.

According to the second aspect of this invention, the concentrate of secondarily produced circulating absorption slurry is kneaded with flyash and either quicklime or slaked lime, the mixture is molded into certain shapes, and then both the water-saturated hot air and the hot air are produced with the heat recovered from flue gas. The latter two are mixed to form a slightly water-unsaturated hot air mixture, and then using the resulting hot air as a drying medium, the kneaded and molded products are dried at a moderate rate to give finally solidified articles as semifinished products.

As described above, the second aspect of the present invention makes it possible to produce solid moldings usable as building materials from the slurry consisting principally of gypsum secondarily produced by the wet limestone-gypsum desulfurization of flue gas. It thus permits effective utilization of gypsum or flyash that have sometimes been produced in excess depending on market conditions.

DETAILED DESCRIPTION OF THE PREFERRED EMBODIMENTS

Figure 1:
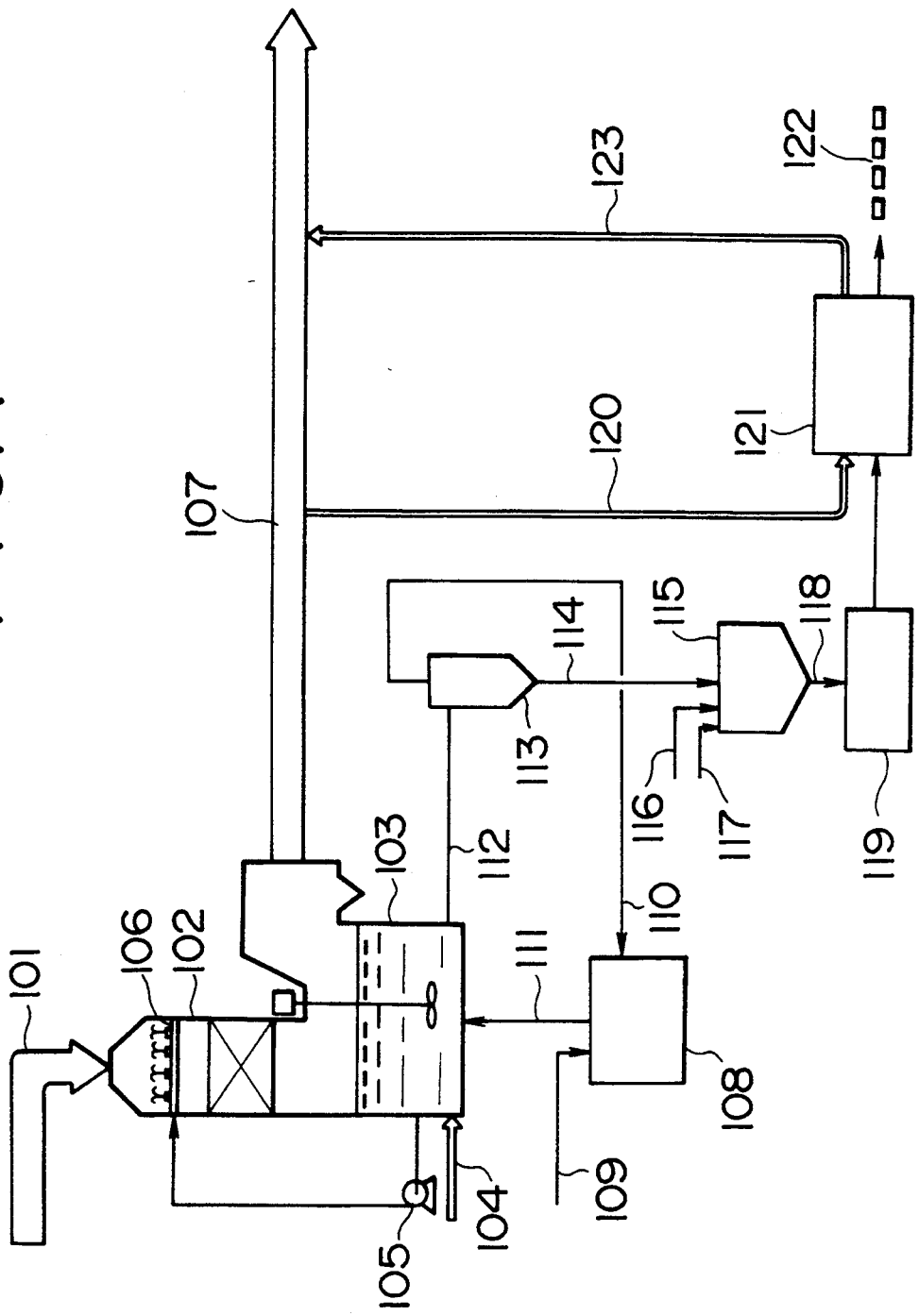
FIG. 1 is a schematic diagram of an embodiment according to a first aspect of the present invention.

The operation of the first aspect of the invention will now be described by way of example with reference to FIG. 1. Flue gas which contains $SO_2$ is introduced via line 101 into an absorption column 102, where it comes in contact with an absorption slurry. A tank 103 at the bottom of the absorption column is supplied with air through line 104 to oxidize calcium sulfite in the slurry to gypsum.

The Slurry as a suspension chiefly of gypsum particles and limestone particles is forced out and up from the bottom tank 103 of the absorption column by an absorption-column circulating pump 105. It is then sprayed through spray pipes 106 to entrap and absorb $SO_2$ from the flue gas. The treated gas is discharged from the system by way of line 107.

Limestone particles-are fed as an ingredient of absorbent through line 109 to a material preparation tank 108, where it is mixed with an overflow supplied from a cyclone 113 through line 110 to form a slurry. The slurry is supplied via line 111 to the bottom tank 103 of the absorption column.

The slurry circulating through the absorption column is partly drawn out through line 112 and conducted to a step for concentrating solids in the slurry. To be more specific, a part of slurry is fed to a liquid cyclone 113 as shown in FIG. 1. After the separation of solids, the overflow from the cyclone is supplied to the material preparation tank 108 through line 110.

The solids become concentrated in the underflow. During this process the flow ratio of the slurry supply into the liquid cyclone 113 to the underflow discharge from the cyclone through line 114 is adjusted to maintain a solids concentration of 30 to 60 wt %, for example. If solids concentration is too low, troubles, such as deformation or inadequate strength of moldings in the molding and curing steps or prolongation of curing time, would subsequently ensue. If the solids are overly concentrated, on the other hand, the slurry would be deprived of fluidity, and it would become difficult to continuously draw the slurry from the cyclone.

The concentrated slurry drawn out through line 114 is transferred to a mixing step. It is led into a mixer 115, where it is mixed with flyash supplied from a coal-fired combustion source through line 116 and quicklime powder from line 117. The quicklime may be replaced by slaked lime.

The mixing ratio of slurry and flyash and quicklime, on the dry weight basis, is desirably in the range of 25–40:40–65:6–20. If the proportion of quicklime is too small the resulting moldings lack strength, and if excessive, it adds no more strength and leads to a waste of quicklime. The proportions by weight of flyash and slurry in the above specified range give solid moldings with adequate strength with utmost stability.

When slaked lime is used instead, it is appropriately added in an amount equimolar to that of quicklime, or in an amount about 1.3 times the weight specified in the ratio described above.

The mixture is fed through line 118 to a molder 119, where it is placed into molds and pressed into given shapes, and the resulting moldings are sent to the subsequent curing step.

In the curing step, water-saturated atmosphere and a heat source are indispensable to avoid cracking due to rapid drying of the moldings. For this reason the gas after the desulfurization treatment is introduced into the curing step. As flue gas comes in contact with the absorption slurry in the absorption column, it is cooled to water saturation in an adiabatic process, usually forming water-saturated gas at 45°to 65° C. A part of this water-saturated gas is drawn out through line 120 into a curing chamber 121. The moldings charged into the curing chamber 121 are heated in the water-saturated atmosphere with the gas from the absorption column, and the solidification reaction proceeds. After a certain curing time, the moldings 122 that have attained sufficient strength for use as building materials are taken out of the curing chamber 121. The treated flue gas that has passed through the curing chamber 121 is returned via line 123 to a gas discharge line 107.

(EXPERIMENTAL EXAMPLE 1)

Flue gas supplied at a flow rate of 200 m³N/h was treated and solid moldings were produced in conformity with the schematic diagram of FIG. 1, in the following way.

In this example, a twin-screw mixer was used as the mixer 115 in FIG. 1. The temperature of the gas after desulfurization was 55° C. The slurry which had been concentrated by the liquid cyclone 113 was adjusted to a solids concentration of 40 wt % and kneaded with flyash and quicklime in a weight ratio of concentrated slurry: flyash: quicklime=30:60:10.

The mixture was molded and the moldings were allowed to stand in the curing chamber 121 for 3 days. The moldings, when tested for their compressive strength, gave a mean value of 132 kgf/cm². Each molding measured 4 cm by 4 cm by 16 cm in size and was cut into cubic test pieces measuring 4 cm by 4 cm by 4 cm each. The solid moldings were comparable in strength to bricks and other similar building materials, and were found usable as such.

(EXPERIMENTAL EXAMPLE 2)

In the same manner as described in Experimental Example 1, following the diagram of FIG. 1, flue gas at a flow rate of 200 m³N/h was treated to give solid moldings. The only exception was that the slurry used was concentrated without the air supply through line 104 to the bottom tank 103 of the absorption column in FIG. 1. The slurry concentration after the condensation, the mixing ratio of the concentrated slurry, flyash, and quicklime, curing conditions, and other operating conditions were exactly the same as those used in Experimental Example 1.

The mean compressive strength of the moldings was determined by the procedure of Experimental Example 1. The measured mean value of 128 kgf/cm² proved that the products were sufficiently strong to serve as building materials.

(Comparative Example 1)

Moldings of the same compositions as those of Experimental Examples 1 and 2 were allowed to stand in the curing chamber 121 for the same period of 3 days as used in the examples but without passing the treated gas through the chamber. Their average compressive strength value was 32 kgf/cm². Some test specimens had cracks, indicating their deficiency in moldability, and the moldings were not considered suitable as construction material.

(Comparative Example 2)

A slurry concentrated in the manner described in Experimental Examples 1 and 2 was mixed only with flyash in a mixing ratio of the concentrated slurry: flyash=30:60, and the mixture was molded. The moldings were held in the curing chamber 121 with the circulation of the treated gas in the same way as in Experimental Examples 1 and 2.

The cured moldings were tested for their compressive strength exactly in the same manner as in Experimental Examples 1 and 2. With strength values of 10 kgf/cm² or less, they were all unsuitable as building materials A comparison between the experimental examples of the invention and the comparative examples shows that the steps of the present invention, i.e., mixing of the slurry with quicklime or slaked lime and curing of the resulting moldings in a curing chamber through which the treated gas is circulated, are essential for the development of strength in the solid moldings.

An embodiment for the second aspect of the invention will now be described concretely with reference to FIG. 2. Untreated flue gas 201 introduced into an absorption column 202 is freed from sulfur there by contact with a spray of circulating absorption slurry which is forced out of an array of spray pipes 206 in the upper space of the column 202 by a pump 205. It is then discharged as clean gas 207. The circulating absorption slurry that has absorbed $SO_2$ from the gas and flown down into a circulating tank 203 contains the absorbed $SO_2$ in the form of a sulfite. In order to oxidize this sulfite into gypsum, air 204 is injected into the circulating tank 203 at the bottom.

In the meantime, line 211 supplies the circulating tank 203 with a limestone slurry absorbent in an amount adequately proportional to the stoichiometric amount of the SO₂ absorbed. An amount of the circulating absorption slurry corresponding to that being supplied is drawn out via line 212 into a slurry concentrator 213, where it becomes concentrated. The concentrated slurry is led via line 217 into a mixing tank 220. Limestone is fed through line 209 to the limestone storage tank 210. On the other hand, most of dilute slurry is returned through line 210 to a limestone slurry storage tank 208, and the remainder is discharged as waste water through line 215 to a waste water disposal station 216 so as to avoid accumulation of impurities. The mixing tank 220 is supplied with flyash 218 and either quicklime or slaked lime 219 in addition to the concentrated slurry. The mixture is thoroughly kneaded in the tank 220 and transferred to a molder 221 where it is molded to an article of a given shape. Next, the article is conveyed to a cure drier 222.

The heat recovered by a heat-recoverer 230 is supplied via a heating-medium circulation line 225 to an air heater 229 and a water-saturated hot air generator 226. It then heats, through heat exchange, air 228 in the air heater 229 and water 227 and hot air 224 in the water-saturated hot air generator 226. The hot air 224 produced by the air heater 229 and the water-saturated hot air 223 produced by the water-saturated hot air generator 226 are mixed to form air 231 which is slightly under-saturated, and this water-unsaturated air 231 is then supplied to the cure drier 222. In the cure drier 222 the water-unsaturated hot air 231 is supplied for a given period of time corresponding to the size of the moldings to perform cure drying. After the predetermined period, a solid molding 233 is obtained as a secondary product.

The present invention has so far been described as embodied in an arrangement, where a part or most of the emission 232 from the cure drier 222 may be recycled to the water-saturated hot air generator 226.

Figure 2:
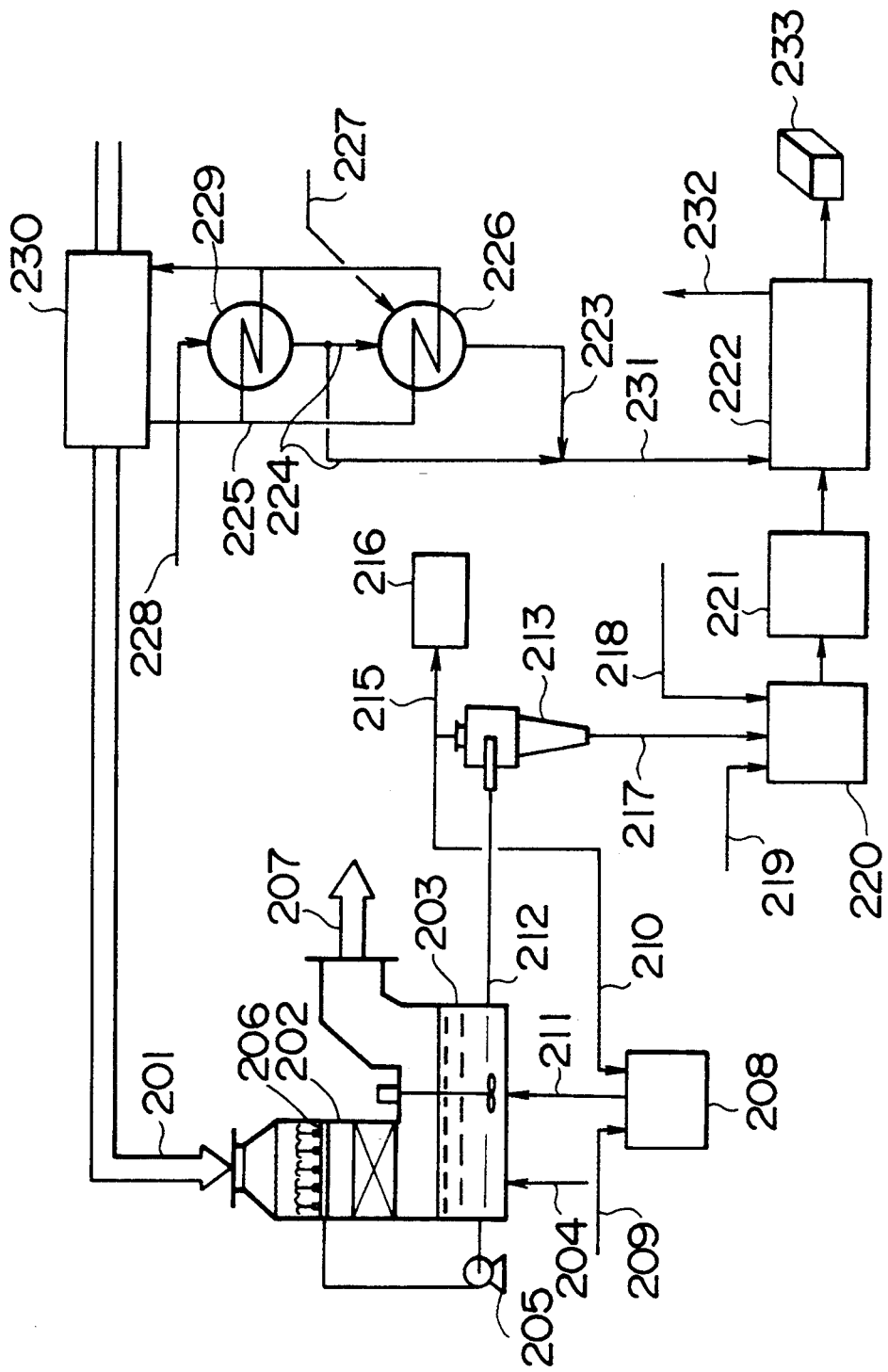
FIG. 2 is a schematic diagram of a wet limestone-gypsum-process flue-gas desulfurization apparatus for practicing the method according to a second aspect of the invention.
Figure 3:
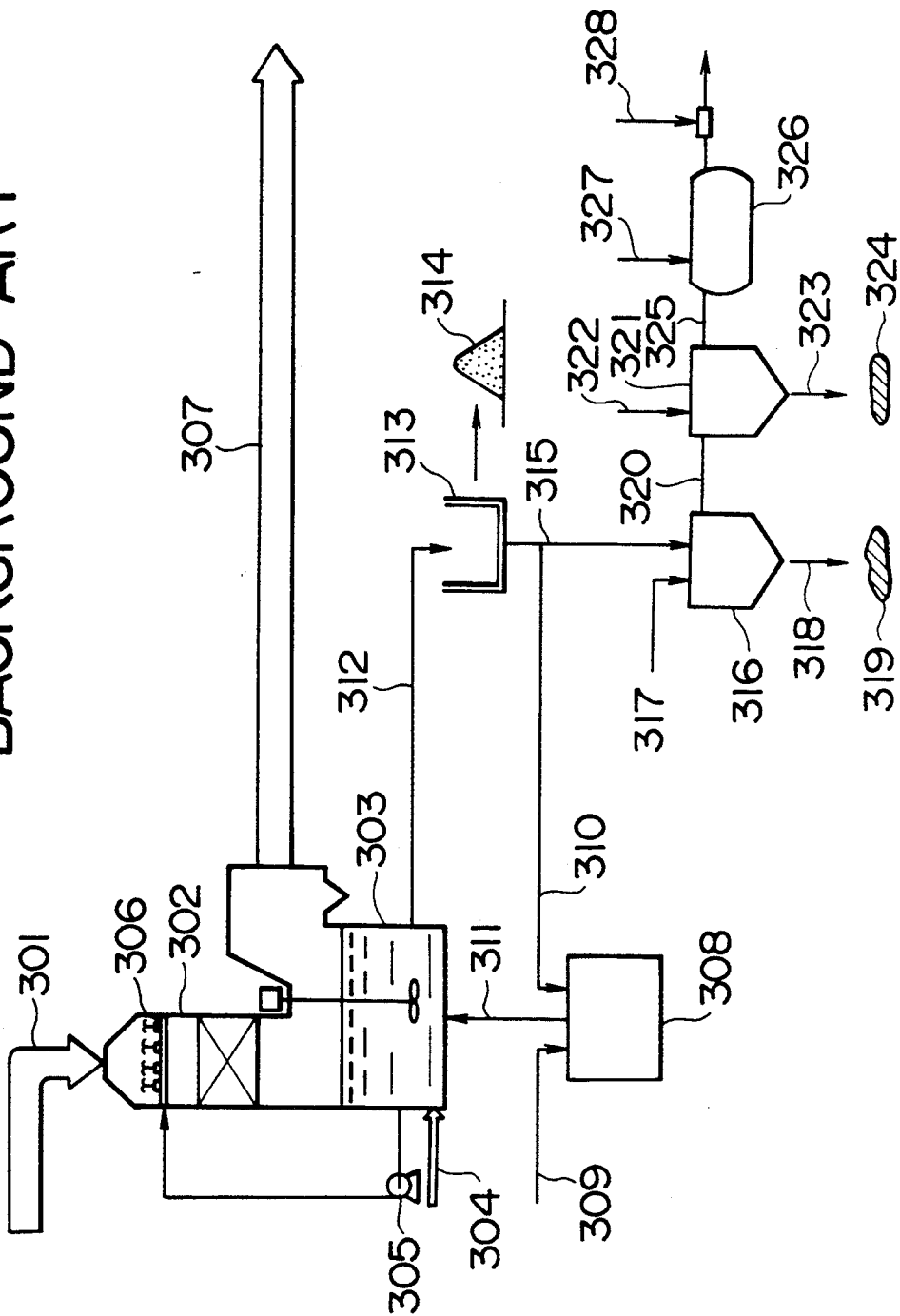
FIG. 3 is a schematic diagram of an arrangement for conventional wet limestone-gypsum desulfurization of flue gas.
Figure 4:
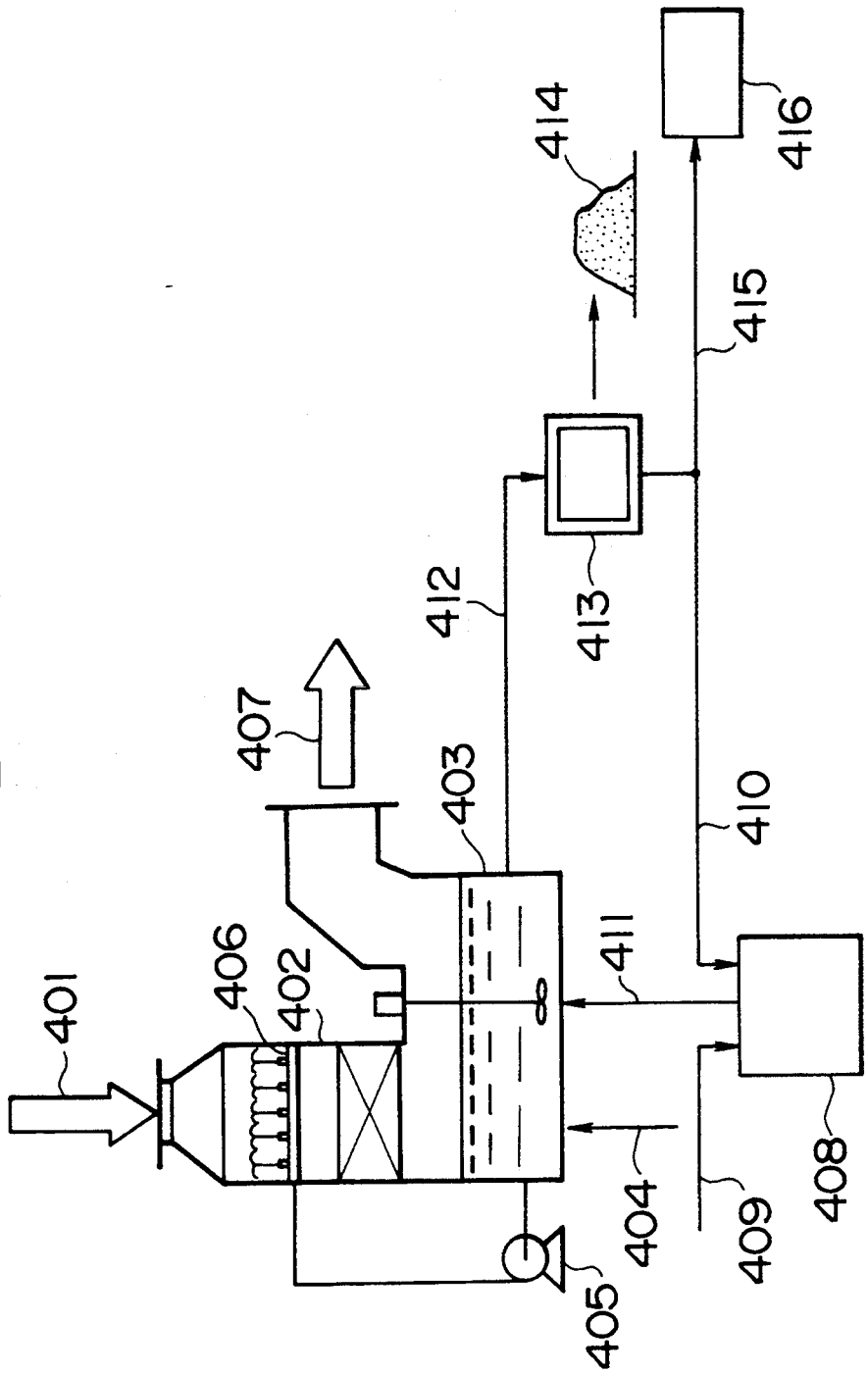
FIG. 4 is a schematic diagram of another arrangement of conventional wet limestone-gypsum desulfurization of flue gas.

The second aspect of the invention will be further described concretely in connection with the embodiment illustrated in FIG. 2 and an experimental example.

(EXPERIMENTAL EXAMPLE 3)

In the wet limestone-gypsum-process flue-gas desulfurization apparatus designed to treat 8000 m³N/h of untreated flue gas 201 containing 1450 ppm SO₂ at 180° C., 500 m³N/h of air 228 was heated to 60° C. with the heat recovered by the heat recoverer 230. Of the air 224 thus heated, 80% was supplied to the water-saturated hot air generator 226 to produce water-saturated hot air 223 at 60° C., which in turn was mixed with the remainder of the hot air 224 and fed together to the cure drier 222.

Meanwhile, the slurry concentrator 213 supplied a concentrated slurry having a solids concentration of about 40% at the rate of 25 kg/h (on the dry solids basis) to the mixer 220. The mixer 220 was further supplied with 50 kg of flyash 218 and with 8 kg of quicklime 219 per hour. The mixture kneaded by the mixer 220 was molded by the molder 221 to an article measuring 4 cm by 4 cm by 16 cm and fed to the cure drier 222. The article was cured to dryness for about 3 days in the cure drier 222, and was taken out as a solid molding. The solid molding thus obtained from the drier 222 was cut into 4 cm³ cubic pieces and tested for compressive strength. The test pieces gave values of 130 kgf/cm² or more. These values are comparable to those of bricks and other similar building materials, and the material is considered usable for building purposes.

We claim:

1. A method of producing a solid molding from slurry which has done absorption in wet limestone-gypsum desulfurization of flue-gas comprising the steps of:
    a) concentrating a gypsum-containing absorption slurry drawn from a wet limestone-gypsum flue-gas desulfurization apparatus;
    b) mixing and kneading the concentrated slurry with flyash from a coal-fired combustion source and also with either quicklime or slaked lime to for a mixture;
    c) molding the mixture into a desired shape using a mold;
    d) then curing the molded mixture in a reaction chamber through which a part of desulfurization gas which is saturated with water due to the wet limestone-gypsum flue-gas desulfurization is passed; whereby the solid molding is produced.

2. A method according to claim 1, wherein a molded mixture is cured in the reaction chamber for three days.

3. A method according to claim 1, wherein a compressive strength of the solid molding is 128 kgf/cm²–132 kgf/cm².

4. A method according to claim 1, wherein a solid concentration of slurry in step (a) is maintained at 30–60% weight.

5. A method of producing 2 solid molding product from a by-product of wet limestone-gypsum desulfurization of flue-gas comprising the steps of:
    a) concentrating an absorption slurry drawn from a wet limestone-gypsum desulfurization apparatus;
    b) kneading the concentrated slurry which consists substantially of gypsum with flyash and either quicklime or slaked lime into a mixture and molding the mixture to a desired shape;
    c) then solidifying the molded mixture by drying with water-unsaturated hot air produced with heat recovered from the flue-gas and with water added into a heat recovery process; whereby the solid molding product is produced.

6. The method according to claim 5, wherein a mixing ratio of the concentrated slurry, flyash and quicklime on a dry basis is in a range of 25–40:40–65:6–20.

7. A method according to claims 6, wherein the ratio of the slurry, flyash and quicklime is in the range of 30:60:10.

8. A method according to claim 5 further comprising recycling emitted air obtained from the drying of the molded mixture with water saturated hot air.

* * * * *